US008646699B2

(12) United States Patent
Takamori

(10) Patent No.: US 8,646,699 B2
(45) Date of Patent: Feb. 11, 2014

(54) IMAGE READING APPARATUS, IMAGE READING METHOD, AND IMAGE READING PROGRAM

(71) Applicant: PFU Limited, Kahoku (JP)

(72) Inventor: Masaya Takamori, Ishikawa (JP)

(73) Assignee: PFU Limited, Ishikawa (JP)

( * ) Notice: Subject to any disclaimer, the term of this patent is extended or adjusted under 35 U.S.C. 154(b) by 0 days.

(21) Appl. No.: 13/708,502

(22) Filed: Dec. 7, 2012

(65) Prior Publication Data
US 2013/0186952 A1    Jul. 25, 2013

(30) Foreign Application Priority Data
Jan. 19, 2012  (JP) .................................. 2012-009099

(51) Int. Cl.
*G06K 19/06*        (2006.01)
(52) U.S. Cl.
USPC .......................................... 235/492; 235/375
(58) Field of Classification Search
USPC ................. 235/375, 492; 358/3.28; 340/10.1, 340/10.52
See application file for complete search history.

(56) References Cited

U.S. PATENT DOCUMENTS

| 2002/0170973 A1* | 11/2002 | Teraura | 235/492 |
| 2007/0069856 A1* | 3/2007 | Lee | 340/10.1 |
| 2009/0122350 A1* | 5/2009 | Alverson et al. | 358/3.28 |
| 2010/0245058 A1* | 9/2010 | Kojima | 340/10.52 |

FOREIGN PATENT DOCUMENTS

| JP | 2007-183812 A | 7/2007 |
| JP | 2010-079616 A | 4/2010 |

* cited by examiner

*Primary Examiner* — Kristy A Haupt
(74) *Attorney, Agent, or Firm* — McDermott Will & Emery LLP

(57) ABSTRACT

An image reading apparatus includes an RFID (radio frequency identification) detection unit that detects a reading RFID (radio frequency identification) tag disposed to a reading target; an image reading unit that reads an image of the reading target; a diagnosing RFID (radio frequency identification) tag capable of being detected by the RFID detection unit; and an abnormality determination unit that determines abnormality based on a state of detection of the RFID detection unit. When the diagnosing RFID tag is detected at the time the reading RFID tag is not detected by the RFID detection unit, the abnormality determination unit determines abnormality of the reading RFID tag, and when the diagnosing RFID tag is not detected, the abnormality determination unit determines abnormality of the RFID detection unit.

5 Claims, 4 Drawing Sheets

US 8,646,699 B2

IMAGE READING APPARATUS, IMAGE READING METHOD, AND IMAGE READING PROGRAM

CROSS-REFERENCE TO RELATED APPLICATION

This application is based upon and claims the benefit of priority from Japanese Patent Application No. 2012-009099, filed Jan. 19, 2012, the entire contents of which are incorporated herein by reference.

BACKGROUND OF THE INVENTION

1. Field of the Invention

The invention relates to an image reading apparatus, an image reading method, and an image reading program.

2. Description of the Related Art

Conventionally, an image reading apparatus is known which can read image data of a reading surface of a reading target having an RFID (Radio Frequency Identification) tag and information recorded to the RFID tag from the reading target by an operation executed once.

In the image reading apparatus, it is preferable to be able to simply confirm whether a reading process of the RFID tag can be normally executed. As a technology of the simple confirmation, for example, Japanese Laid-open Patent Publication No. 2007-183812, and Japanese Laid-open Patent Publication No. 2010-79616 disclose a technology for disposing an identification RFID tag in a reader device for reading an RFID tag and diagnosing whether or not the reader device normally executes a reading process of the RFID tag depending on whether or not the identification RFID tag can be read.

However, in the conventional diagnosing technology of the RFID tag reading process described in Japanese Laid-open Patent Publication No. 2007-183812, and Japanese Laid-open Patent Publication No. 2010-79616, when it is diagnosed that the RFID tag reading process is not normally executed, the conventional diagnosing technology cannot discriminate whether abnormality occurs in the RFID tag or abnormality occurs in the reader device and a communication system including an RFID antenna. Accordingly, even if abnormality is detected in an RFID system of an image reading apparatus, since it takes a time to specify an abnormal portion, there is a possibility that a job stop time of a user becomes long.

SUMMARY OF THE INVENTION

It is an object of the present invention to at least partially solve the problems in the conventional technology.

According to an aspect of the present invention, an image reading apparatus includes: an RFID (radio frequency identification) detection unit that detects a reading RFID (radio frequency identification) tag disposed to a reading target; an image reading unit that reads an image of the reading target; a diagnosing RFID (radio frequency identification) tag capable of being detected by the RFID detection unit; and an abnormality determination unit that determines abnormality based on a state of detection of the RFID detection unit. When the diagnosing RFID tag is detected at the time the reading RFID tag is not detected by the RFID detection unit, the abnormality determination unit determines abnormality of the reading RFID tag, and when the diagnosing RFID tag is not detected, the abnormality determination unit determines abnormality of the RFID detection unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
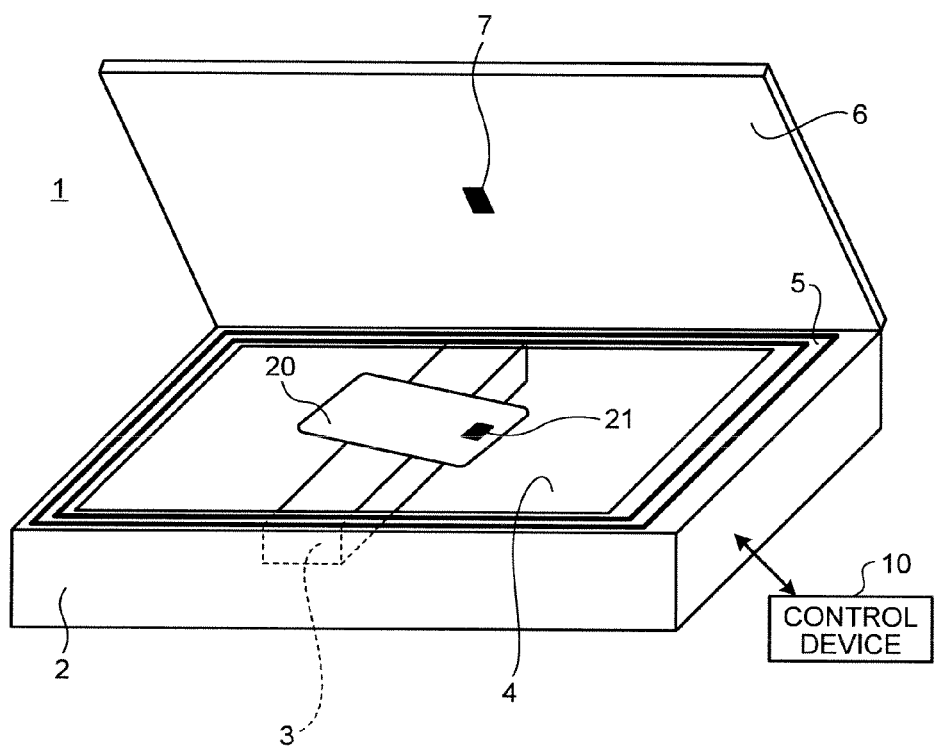
FIG. 1 is a perspective view illustrating a schematic configuration of an image reading apparatus according to an embodiment of the invention.

An embodiment of an image reading apparatus according to the present invention will be explained based on drawings. Note that, in the following drawings, the same portions or corresponding portions are denoted by the same reference numerals and are not explained repeatedly.

Figure 2:
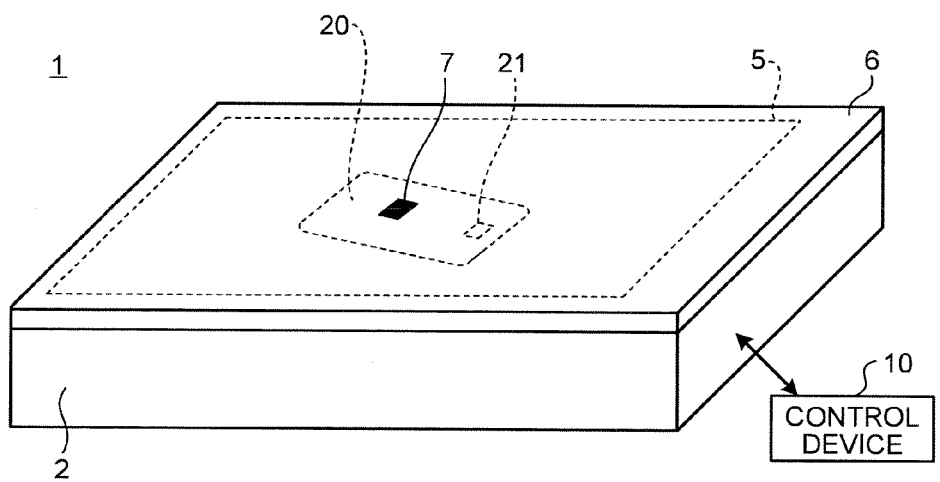
FIG. 2 is a perspective view illustrating a state in which a document cover of the image reading apparatus of FIG. 1 is closed.
Figure 3:
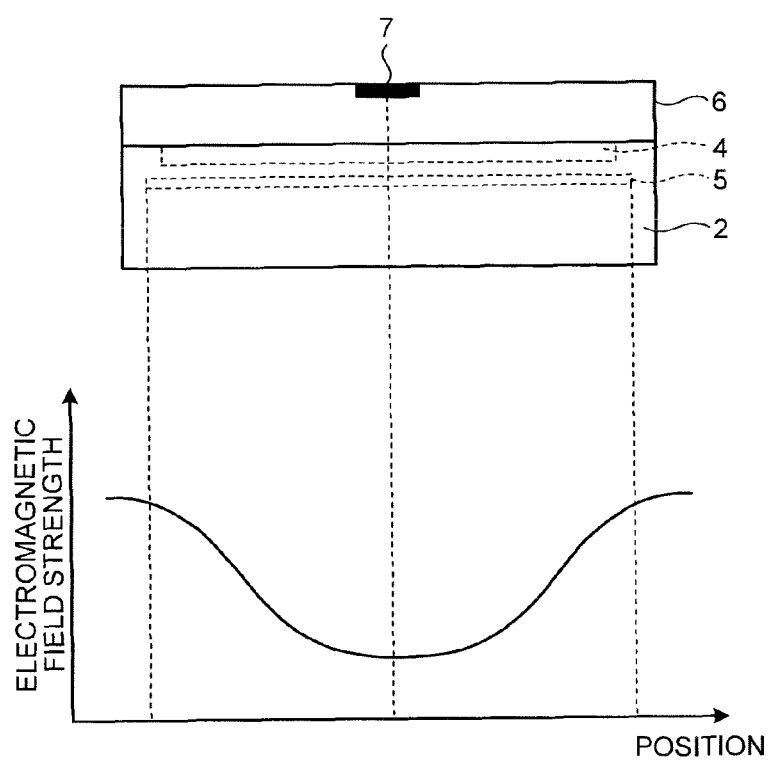
FIG. 3 is a schematic view illustrating an electromagnetic field strength of an RFID antenna in FIGS. 1 and 2.
Figure 4:
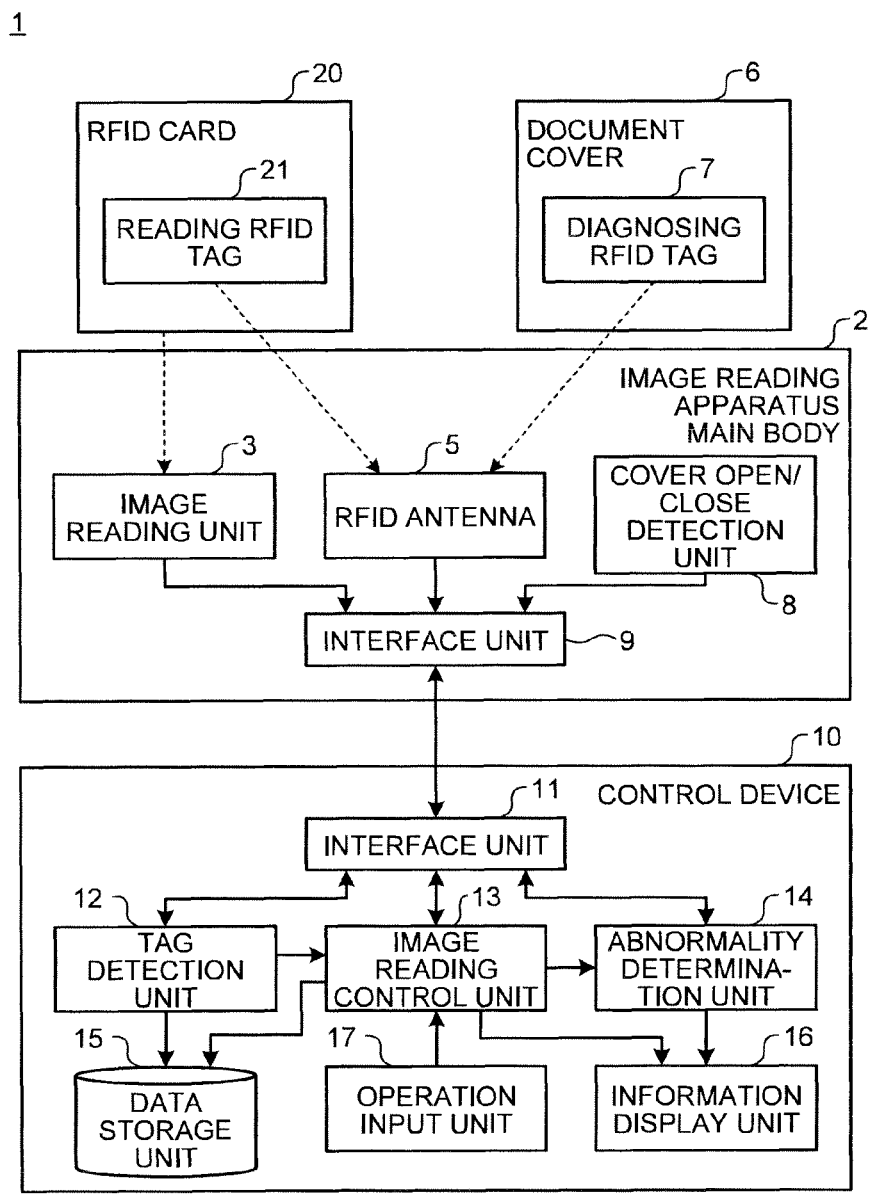
FIG. 4 is a function block diagram of the image reading apparatus according to the embodiment.

First, a configuration of the image reading apparatus according to the embodiment of the present invention will be explained referring to FIGS. 1 to 4. FIG. 1 is a perspective view illustrating a schematic configuration of the image reading apparatus according to the embodiment of the invention, FIG. 2 is a perspective view illustrating a state in which a document cover of the image reading apparatus of FIG. 1 is closed, FIG. 3 is a schematic view illustrating an electromagnetic field strength of an RFID antenna in FIGS. 1 and 2, and FIG. 4 is a function block diagram of the image reading apparatus according to the embodiment.

As illustrated in FIG. 1, an image reading apparatus 1 is a flatbed type scanner apparatus for creating image data of a reading target 20 by holding the reading target 20 on a placing surface 4 and moving an image reading unit 3. When the image data of the reading target 20 is created, the image reading apparatus 1 can further read ID information recorded to a reading RFID tag 21 provided with the reading target 20. That is, the image reading apparatus 1 of the embodiment mainly uses a medium having the reading RFID tag 21 to which the ID information is recorded as the reading target 20. Specifically, the medium used as the reading target 20 can include cards and papers, for example, a driver's license, a credit card, and a cash card. In the embodiment, the reading targets 20 including the RFID tag are described as "RFID cards 20" as a whole.

Note that the term "RFID" used in the embodiment is ordinarily defined such that the term "RFID" means a non-contact authentication technology making use of an information communication technology and an IC chip (tag) that use a wireless system and can be defined so as to include a passive type, in which a tag transmits a signal according to an electric field and a magnetic field output by an antenna, an active type, in which a tag transmits a signal by an internal power supply, and a noncontact-type IC card technology such as Felica (registered trademark) system. The embodiment will be explained exemplifying the passive type RFID system.

The image reading apparatus 1 includes the image reading unit 3, an RFID antenna 5 (RFID detection unit), and a control device 10.

The image reading unit 3 is an optical reading device having a scanner function built in a main body 2 of the image reading apparatus 1. The image reading unit 3 can read an image of the RFID card 20 on the placing surface 4 by moving along the placing surface 4 according to control of the control device 10.

The RFID antenna 5 is a communication device for reading the ID information from the RFID tag. The RFID antenna 5 is disposed in a square shape along a peripheral edge of the placing surface 4 and generates an electric field or a magnetic field (hereinafter, described as "electromagnetic field") on the placing surface 4 according to the control of the control device 10. Since the RFID tag has such a property that when the RFID tag is exposed to an electromagnetic field, it wirelessly transmits the ID information recorded therein, the RFID antenna 5 can receive the ID information from the reading RFID tag 21 of the RFID card 20 on the placing surface 4 by generating an electromagnetic field to the placing surface 4.

Note that, in the embodiment, as illustrated in FIG. 1, since the RFID antenna 5 is formed in the rectangular shape along the peripheral edge of the placing surface 4, an electromagnetic field strength on the placing surface 4 when the RFID antenna 5 generates the electromagnetic field is maximized in the vicinity of a peripheral edge portion of the placing surface 4, continuously reduced toward a central portion of the placing surface 4, and minimized in the vicinity of the central portion of the placing surface 4 as illustrated in FIG. 3.

The image reading apparatus 1 includes a document cover 6 (lid member) for covering the placing surface 4. The document cover 6 is openably/closeably attached using, for example, a side of an upper surface of the main body 2 as an axis of rotation. The document cover 6 is configured such that when the document cover 6 is opened (hereinafter, also described as an open state) as illustrated in FIG. 1, it is away from the placing surface 4 upward, whereas when the document cover 6 is closed (hereinafter, also described as a closed state) as illustrated in FIG. 2, it can cover the placing surface 4 and the RFID card 20 placed on the placing surface 4 from thereabove.

The document cover 6 is provided with a diagnosing RFID tag 7. The diagnosing RFID tag 7 has a configuration similar to that of the reading RFID tag 21, and when the diagnosing RFID tag 7 enters an electromagnetic field region of the RFID antenna 5, it can transmit ID information recorded therein.

It is sufficient that the diagnosing RFID tag 7 is disposed at a position where it can read the ID information by the RFID antenna 5 when the document cover 6 is closed, and, preferably, the diagnosing RFID tag 7 is disposed at a position where the RFID antenna 5 has a weakest electromagnetic field strength. As described above, in the embodiment, since the electromagnetic field strength by the RFID antenna 5 becomes weakest in the vicinity of the central portion of the placing surface 4, the diagnosing RFID tag 7 is attached in the vicinity of the central portion of the document cover 6 so that the diagnosing RFID tag 7 is positioned above the central portion of the placing surface 4 when the document cover 6 is closed. With the configuration, the reading RFID tag 21 of the RFID card 20 is not disposed in a region where the electromagnetic field strength of the RFID antenna 5 is weak as compared with the diagnosing RFID tag 7. Accordingly, in a state in which the diagnosing RFID tag 7 is detected, since the reading RFID tag 21 can be detected regardless of a position of the placing surface 4 where the RFID card 20 is placed, reliability of detection of the reading RFID tag 21 can be improved.

Note that ID information of the reading RFID tag 21 received by the RFID antenna 5 can include information which shows that a received signal is transmitted from the reading RFID tag 21, for example, information as to a type and an owner of the RFID card 20 to which the reading RFID tag 21 is disposed. Further, the ID information of the diagnosing RFID tag 7 received by the RFID antenna 5 can include information which shows that a received signal is transmitted the diagnosing RFID tag 7, that is, information as to the diagnosing RFID tag 7 itself.

As further illustrated in FIG. 4, the main body 2 of the image reading apparatus 1 is built in with a cover open/close detection unit 8 for detecting whether the document cover 6 is opened or closed. For example, a limit switch, a micro switch, and a proximity sensor can be applied to the cover open/close detection unit 8.

Further, an interface unit 9 is built in the main body 2 of the image reading apparatus 1. The interface unit 9 relays a communication between the image reading unit 3, the RFID antenna 5, and the cover open/close detection unit 8, and the control device 10. The interface unit 9 is a communication device for making a communication with other equipment such as an input/output port.

The control device 10 controls an image reading operation to the RFID card 20 executed by the image reading unit 3 and a reading operation of the ID information from the RFID tag executed by the RFID antenna 5. In the embodiment, the control device 10 is further configured so that it can detect an occurrence of abnormality of the reading RFID tag 21 or an occurrence of abnormality of the RFID antenna 5 based on a reading state of the RFID antenna 5.

As illustrated in FIG. 4, the control device 10 includes an interface unit 11, a tag detection unit 12, an image reading control unit 13, an abnormality determination unit 14, a data storage unit 15, an information display unit 16, and an operation input unit 17.

The interface unit 11 connects the image reading unit 3, the RFID antenna 5, and the cover open/close detection unit 8 to the tag detection unit 12, the image reading control unit 13, and the abnormality determination unit 14 of the control device 10 via the interface unit 9 of the main body 2 so that a communication can be made therebetween.

The tag detection unit 12 controls the RFID antenna 5 and obtains the ID information from the reading RFID tag 21 and the diagnosing RFID tag 7. The tag detection unit 12 analyzes the ID information obtained by the RFID antenna 5 and specifies from which of the reading RFID tag 21 or the diagnosing RFID tag 7 the ID information is received, and thereby the tag detection unit 12 can determine which of the reading RFID tag 21 or the diagnosing RFID tag 7 is detected.

The image reading control unit 13 controls the image reading unit 3, reads an image of the RFID card 20, and creates image data of the RFID card 20. The image reading control unit 13 can execute the image reading operation via the operation input unit 17 according to an input operation of a user and stores the created image data to the data storage unit 15.

The abnormality determination unit 14 determines whether or not any abnormality such as a failure and a breakage occurs to the RFID system (the reading RFID tag 21 and the RFID antenna 5) based on results of detection of the reading RFID tag 21 and the diagnosing RFID tag 7 executed by the tag detection unit 12. Specifically, (1) when both of the reading RFID tag 21 and the diagnosing RFID tag 7 are detected by the tag detection unit 12, the abnormality determination unit 14 determines that no abnormality occurs to the RFID system and the ID information can be read from the reading RFID tag 21; (2) when only the diagnosing RFID tag 7 is detected by the tag detection unit 12 and the reading RFID tag 21 is not detected, the abnormality determination unit 14 determines that abnormality occurs to the reading RFID tag 21 of the RFID card 20; and (3) when any of both the reading RFID tag 21 and the diagnosing RFID tag 7 is not detected, the abnormality determination unit 14 determines that abnormality occurs to a communication circuit as to the RFID antenna 5 or as to the RFID system on the main body side. An abnormality determination process executed by the abnormality determination unit 14 will be described later in detail referring to FIG. 5.

The data storage unit 15 stores the image data of the RFID card 20 created by the image reading control unit 13. The information display unit 16 displays message information created by the image reading control unit 13 and the abnormality determination unit 14 on a display device, for example, a display and shows the message information to the user. The operation input unit 17 detects an instruction input of the user via an input device such as a mouse, a key board, and a touch panel.

Physically, the control device 10 is a computer having a CPU (Central Processing Unit), RAM (Random Access Memory), and ROM (Read Only Memory). All or a part of the respective functions of the control device 10 described above is realized by loading an application program held by the ROM on the RAM, executing the application program by the CPU, and reading and writing data from and to the RAM and the ROM. The control device 10 includes an input device such as a key board and a mouse, display device such as a display, and communication device such as an input/output port, and the all or the part of the respective functions of the control device 10 described above is realized in such a manner that the application program executed by CPU inputs an instruction operation by the user, displays a message and a result of determination of abnormality to the user, and makes a communication to the main body 2 of the image reading apparatus 1 making use of these devices.

Further, the application program may be stored in a recording medium which can be read by the computer or may be configured as a program product. Here, it is assumed that the "recording medium" includes any of "optional portable physical media" such as a memory card, USB (universal serial bus) memory, an SD (secure digital) card, a flexible disc, a magnetic optical (MO) disc, ROM, EPROM, EEPROM, a CD-ROM, an MO, a DVD (digital versatile disc), and a Blu-ray (trademark) disc. Further, the application program may be stored in an application program server connected to the control device 10 via an optional network and all or a part of the application program can be also downloaded when necessary.

Figure 5:
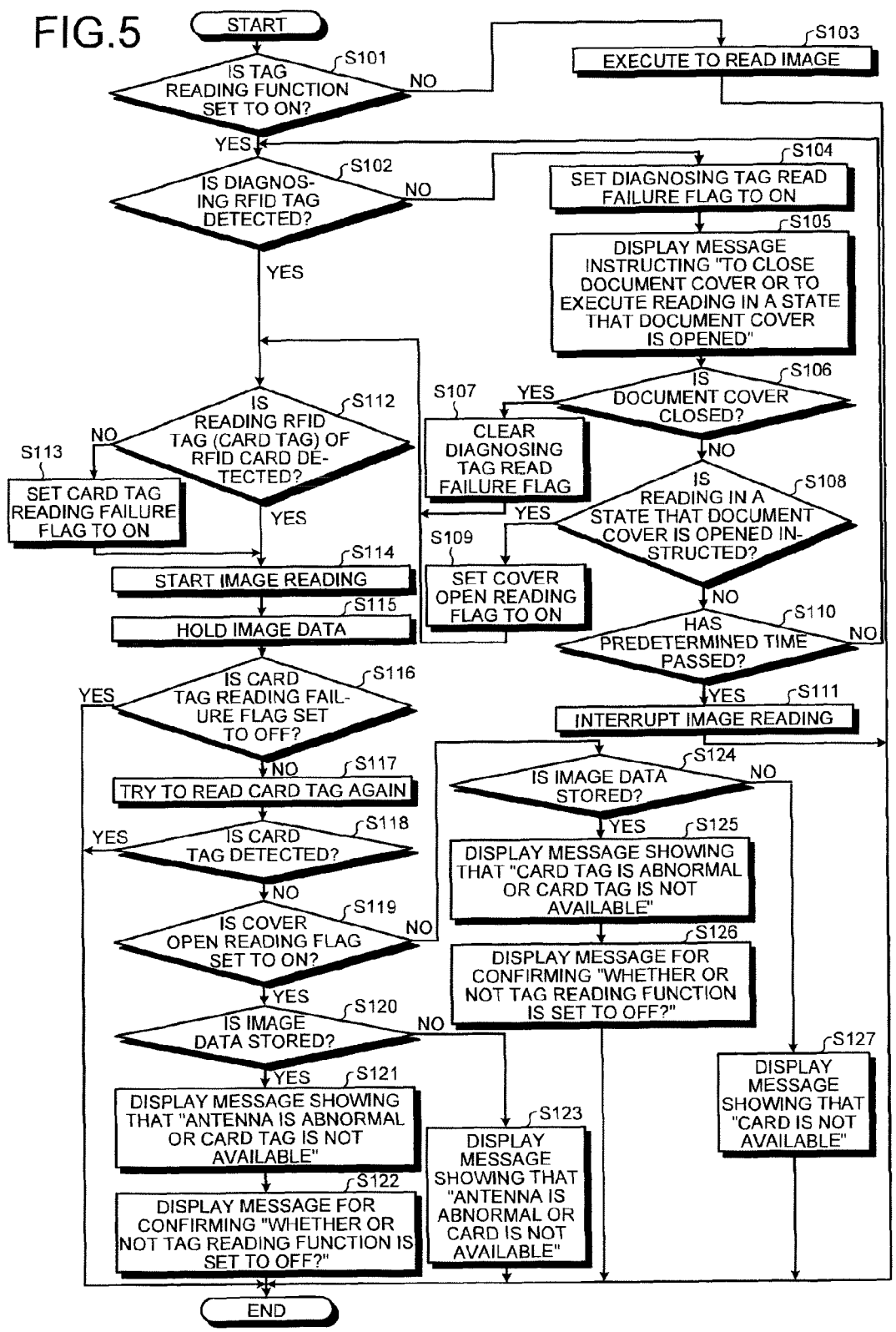
FIG. 5 is a flowchart illustrating an image reading process and an abnormality detecting process executed by the image reading apparatus according to the embodiment.

Next, an operation of the image reading apparatus 1 according to the embodiment will be explained referring to FIG. 5. FIG. 5 is a flowchart illustrating an image reading process and an abnormality determination process executed by the image reading apparatus 1 according to the embodiment. The flowchart of FIG. 5 is executed each time, for example, the image reading operation is executed to the RFID card 20 by the control device 10.

First, when a start command of the image reading operation to the RFID card 20 is detected by the operation input unit 17, whether or not a tag reading function is ON (turned on) is confirmed by the image reading control unit 13 (S101).

Here, "tag reading function" is a function for reading the ID information from the reading RFID tag 21. When the tag reading function is set to ON, a process for obtaining the ID information from the reading RFID tag 21 is executed by the RFID antenna 5 in association with the image reading operation. When the tag reading function is set to OFF, only the image reading process is executed by the image reading unit 3 without executing the process for obtaining the ID information. The tag reading function can be set to ON or OFF by, for example, an operation executed by the user via the operation input unit 17.

When the tag reading function is set to OFF at step S101 (S101: No), the process for obtaining the ID information is not executed by the RFID antenna 5 and only the image reading process is executed by the image reading unit 3 (S103), and the process is finished.

When the tag reading function is set to ON at step S101 (S101: Yes), next, the RFID antenna 5 is controlled by the tag detection unit 12 and the reading RFID tag 21 and the diagnosing RFID tag 7 are detected. Then, whether or not the diagnosing RFID tag 7 is detected is confirmed by the tag detection unit 12 (S102: RFID detection step). Whether or not the diagnosing RFID tag 7 is detected can be determined by, for example, analyzing the ID information obtained by the RFID antenna 5 and determining whether or not the ID information is transmitted from the diagnosing RFID tag 7.

When the diagnosing RFID tag 7 is not detected at step S102 (S102: No), a diagnosing tag read failure flag is set to ON by the tag detection unit 12 (S104). The diagnosing tag read failure flag is a flag for showing that the diagnosing RFID tag 7 cannot be detected. The state that the flag is set to ON and the diagnosing RFID tag 7 cannot be detected is a state in which the document cover 6 is opened and the diagnosing RFID tag 7 is out of the electromagnetic field region generated by the REID antenna 5. Thus, a message which instructs "to close document cover or to execute reading in a state that the document cover is opened" is displayed to the user by the information display unit 16 (S105).

Subsequently, whether or not the document cover 6 is closed is confirmed by the tag detection unit 12 in response to the message at step S105 (S106). An open/close state of the document cover 6 can be determined from a result of detection of the open/closed state of the document cover 6 executed by the cover open/close detection unit 8. When it is determined that the document cover 6 is closed (S106: Yes), the diagnosing tag read failure flag is cleared and set to OFF (S107). Since the diagnosing RFID tag 7 transits to a state that it can enter the electromagnetic field region of the RFID antenna 5 and can be detected because the document cover 6 is changed to the closed state, it can be regarded that the diagnosing RFID tag 7 at the time has been detected (hereinafter, the state is expressed also as "a regarded detection of the diagnosing RFID tag") and a process goes to step S112. Note that after it is determined that the document cover 6 is closed (S106: Yes), the tag detection unit 12 may actually detect the diagnosing RFID tag 7 again by controlling the RFID antenna 5 and sets the diagnosing tag read failure flag to OFF (S107).

In contrast, when it cannot be confirmed that the document cover is closed (S106: No), next, it is confirmed whether or not an instruction for executing reading in the state that the document cover is opened is input (S108). When it is instructed to execute the reading in the state that the document cover is opened (S108: Yes), a cover open reading flag is set to ON (S109). At the time, since the document cover 6 remains opened and the diagnosing RFID tag 7 is out of a detection range of the RFID antenna 5, the diagnosing RFID tag 7 can be placed in a state that it cannot be detected (hereinafter, the state is expressed also as "diagnosing RFID tag not detected") and the process goes to step S112.

When it is not instructed to execute the reading in the state that the document cover is opened (S108: No), whether or not a predetermined time has passed is confirmed by the tag detection unit 12 (S110). The predetermined time is, for example, a time having passed after a flow of this time is started. When the predetermined time has not passed (S110: No), the process returns to step S102 and whether or not the diagnosing RFID tag 7 is detected is confirmed again. When the predetermined time has passed (S110: Yes), since the document cover 6 is not closed, it is not instructed to execute the reading in the state that the document cover is opened, and the user does not make a response in response to the message at step S105, the image reading operation is interrupted (S111) and the process is finished.

When the diagnosing RFID tag 7 is detected at step S102 (S102: Yes) or after the process at step S107 or S109 is executed, subsequently, whether or not the reading RFID tag 21 of the RFID card 20 (hereinafter, simply described as also "card tag") is detected by the tag detection unit 12 is confirmed (S112: RFID detection step). When the reading RFID tag 21 is detected (S112: Yes), the process goes to step S114. When the reading RFID tag 21 is not detect (S112: No), a card tag reading failure flag is set to ON (S113) and the process goes to step S114. The card tag reading failure flag is a flag for showing that the reading REID tag 21 cannot be detected.

Next, the image reading operation is started by the image reading control unit 13 (S114: image reading step) and the image data of the RFID card 20 which is obtained by the image reading unit 3 from the image reading unit 3 via the interface units 9, 11 is stored in the data storage unit 15 (S115: image reading step). Subsequently, whether or not the card tag reading failure flag is set to OFF is confirmed (S116).

When the card tag reading failure flag is set to OFF (S116: Yes), the process is finished assuming that the ID information has been read from the reading RFID tag 21 of the REID card 20, the image data of the RFID card 20 has been also obtain, and the image reading operation has been normally executed.

When the card tag reading failure flag is set to ON (S116: No), the reading operation to the card tag (the reading RFID tag 21) is tried again by the tag detection unit 12 (S117) and whether or not the reading RFID tag 21 is detected is confirmed again (S118: RFID detection step). As a result, when the reading RFID tag 21 is detected (S118: Yes), the process is finished assuming that the image reading operation has been normally executed.

In contrast, when the reading RFID tag 21 is not detected (S118: No), whether or not the cover open reading flag is set to ON is confirmed by the abnormality determination unit 14 (S119).

When the cover open reading flag is set to ON (S119: Yes), whether or not image data is stored in the data storage unit 15 is confirmed (S120).

When the image data is stored in the data storage unit 15 (S120: Yes), the diagnosing RFID tag 7 and the reading RFID tag 21 are not detected together, the image data is obtained, and the ID information cannot be obtained from RFID tag regardless of that the image reading operation of the RFID card 20 has been executed. From what is described above, the abnormality determination unit 14 can determine that abnormality has occurred to the RFID antenna 5 and the ID information could not have been obtained (hereinafter, describes as "antenna is abnormal") regardless that the image reading operation of the RFID card 20 had been executed. Further, in the state, although the ID information could not have been obtained from the reading RFID tag 21, since the image data of the reading target (the RFID card 20) could have been obtained, the abnormality determination unit 14 can also determine the state as a state that the reading RFID tag 21 is not simply disposed to the reading target (hereinafter, described as "card tag is not available".

With the determination, a message showing that "antenna is abnormal or card tag is not available" is shown to the user by the abnormality determination unit 14 via the information display unit 16 (S121), and it is shown to the user that abnormality has occurred to the RFID antenna 5 or the reading RFID tag 21 has not been disposed to the medium of the reading target. At the time, since there is a fear that abnormality has occurred to the RFID antenna 5 and there is a possibility that the reading operation of the ID information could not have been normally executed, a message for confirming "Is the tag reading function set to OFF?" is shown by the image reading control unit 13 via the information display unit 16 (S122).

When the image data is not stored in the data storage unit 15 (S120: No), the diagnosing RFID tag 7 and the reading RFID tag 21 are not detected together and the image data is not obtained. From what is described above, the abnormality determination unit 14 can determine that the antenna is abnormal because of a reason similar to that of step S121. Further, in the state, since the image data is not obtained, the abnormality determination unit 14 can also determine that the image reading operation is executed in the state that the RFID card 20 itself acting as the reading target is not placed the placing surface 4 (hereinafter described as "card is not available").

With the operation, a message showing that "antenna is abnormal or card is not available" is displayed to the user by the abnormality determination unit 14 via the information display unit 16 (S123) and it is shown to the user that abnormality has occurred to the RFID antenna 5 or the RFID card 20 has not been placed on the placing surface 4.

In contrast, when the card tag reading failure flag is set to OFF at step S119 (S119: No), it is confirmed whether or not the image data is stored in the data storage unit 15 (S124).

When the image data is stored in the data storage unit 15 (S124: Yes), the diagnosing RFID tag 7 is not detected or is regarded to have been detected, the reading RFID tag 21 is not detected, and the image data is not obtained. From what is described above, since the RFID antenna 5 cannot detect only the reading RFID tag 21, the abnormality determination unit 14 can determine that abnormality has occurred to the reading RFID tag 21 of the RFID card 20 and the ID signal could not been transmitted (hereinafter, described as "card tag is abnormal"). Likewise, in the state, although the ID information could not have been obtained from the reading RFID tag 21, since the image data of the reading target (the RFID card 20) could have been obtained, the abnormality determination unit 14 can also determine that "the card tag is not available."

With the operation, a message showing that "card tag is abnormal or card tag is not available" is shown to the user by the abnormality determination unit 14 via the information display unit 16 (S125), thereby it is shown to the user that abnormality has occurred to the reading RFID tag 21 or the medium of the reading target has not have the reading RFID tag 21. At the time, since there is a fear that abnormality has occurred to the reading RFID tag 21 and there is a possibility that the reading operation of the ID information could not have been normally executed, a message for confirming "Is the tag reading function set to OFF?" is shown to the user (S126) by the image reading control unit 13 via the information display unit 16.

When the image data is not stored in the data storage unit 15 (S124: No), the diagnosing RFID tag 7 is detected or is regarded to be detected, the reading RFID tag 21 is not detected, and the image data is not obtained. From what is described above, the abnormality determination unit 14 can also determine that the RFID card 20 is not placed on the placing surface ("card is not available"). A message showing that "card is not available" is shown to the user by the abnormality determination unit 14 via the information display unit 16 (S127), and it is shown that the RFID card 20 has not been placed on the placing surface 4.

Note that, in the flowchart of FIG. 5, steps S119 to S127 correspond to abnormality determination steps of an image reading method according to the embodiment.

Next, an effect of the image reading apparatus 1 according to the embodiment will be explained.

The image reading apparatus 1 of the embodiment includes the RFID antenna 5 for detecting the reading RFID tag 21 disposed to the RFID card 20, the image reading unit 3 for reading the image of the RFID card 20, the diagnosing RFID tag 7 that can be detected by the RFID antenna 5, and the abnormality determination unit 14 of the control device 10 for determining abnormality based on a state of detection of the RFID antenna 5. When the diagnosing RFID tag 7 is detected at the time the reading RFID tag 21 is not detected by the RFID antenna 5, the abnormality determination unit 14 determines abnormality of the reading RFID tag 21, and when the diagnosing RFID tag 7 is not detected, the abnormality determination unit 14 determines abnormality of the RFID antenna 5.

With the configuration, it can be determined whether the reading RFID tag 21 is abnormal or whether the RFID antenna 5 is abnormal based on the results of detection of the diagnosing RFID tag 7 and the reading RFID tag 21, a portion where abnormality occurs can be easily discriminated, and thereby an abnormal portion of the RFID system can be accurately detected. As a result, when abnormality occurs to the RFID system of the image reading apparatus 1, since it becomes clear whether the portion where the abnormality occurs is on the RFID tag side or on the RFID antenna side, an abnormal portion can be easily specified, a countermeasure can be taken promptly, and the user can minimize a job stop time.

Further, the image reading apparatus 1 of the embodiment is of the flatbed type, the RFID antenna 5 and the image reading unit 3 are disposed to the main body 2 of the image reading apparatus 1, and the diagnosing RFID tag 7 is disposed to the document cover 6 that covers the placing surface 4 on which the RFID card 20 is placed.

With the configuration, the reading operation to the RFID card 20 is executed closing the document cover 6, the reading RFID tag 21 is inevitably positioned between the RFID antenna 5 and the diagnosing RFID tag 7. Accordingly, when the diagnosing RFID tag 7 can be detected, the reading RFID tag 21 can be detected even if at any portion of the placing surface 4 the RFID card 20 is disposed. As a result, the abnormality determination process of the RFID system can be accurately executed without depending on a way of use of the user such as a disposition of the RFID card 20.

Further, the image reading apparatus 1 of the embodiment includes the cover open/close detection unit 8 for detecting the open/close state of the document cover 6, and when it is detected by the cover open/close detection unit 8 that the document cover 6 has been closed at the time the diagnosing RFID tag 7 is not detected by the RFID antenna 5, the abnormality determination unit 14 regards that the diagnosing RFID tag 7 has been detected or detects the diagnosing RFID tag 7 again.

With the configuration, when the document cover 6 changes from the open state to the closed state and the diagnosing RFID tag 7 transits from a state in which it could not have been physically detected to a state in which it can be detected, since it can be regarded that the diagnosing RFID tag 7 has been detected or the diagnosing RFID tag 7 can be detected again, an accuracy of the result of detection of the diagnosing RFID tag 7 can be more improved, and thereby an accuracy of the abnormality determination of the RFID system can be improved.

For example, in the embodiment, although the control device 10 is disposed independently of the main body 2 and controls the respective elements in the main body 2 of the image reading apparatus 1 by making a communication with the main body 2, the control device 10 may be disposed inside of the main body 2 integrally therewith. In the case, the image reading unit 3, the RFID antenna 5, and the cover open/close detection unit 8 are directly connected to the tag detection unit 12, the image reading control unit 13, and the abnormality determination unit 14 without via the interface units 9, 11 as illustrated in FIG. 4 so that a communication can be made therebetween in the main body 2.

Further, in the embodiment, although the flatbed type scanner apparatus is exemplified as the image reading apparatus 1, the image reading apparatus 1 may have any configuration as long as the image reading apparatus 1 has the diagnosing RFID tag 7 disposed on the apparatus side independently of the reading RFID tag 21 disposed to the reading target and may be other scanner apparatus, for example, an ADF (Auto Document Feeder) type scanner apparatus. Further, the image reading apparatus 1 may be an apparatus that can execute the image reading operation to the RFID card 20 that is a reading medium and can include a copy machine, a facsimile, and a character recognizing apparatus in addition to the scanner apparatus.

Further, in the embodiment, although the diagnosing RFID tag 7 is disposed in the vicinity of the central portion of the document cover 6, the diagnosing RFID tag 7 may be disposed at other position of the document cover 6. For example, the diagnosing RFID tag 7 can be disposed so that it can slide in an optional direction above the document cover 6 or can be disposed at an optional position of the document cover 6 by a detachable means such as a magnet and a Velcro tape. Further, plural document covers 6 each provided with the diagnosing RFID tag 7 disposed at a different position may be prepared and may be selectively used appropriately. With the configuration, even if a distribution of the electromagnetic field strength of the RFID antenna 5 is changed due to, for example, aged deterioration and the like, the diagnosing RFID tag 7 can be appropriately disposed. Further, when the diagnosing RFID tag 7 is broken, since the diagnosing RFID tag 7 can be replaced in a partial unit at low cost without replacing the entire device, a maintenance cost can be suppressed.

Since the image reading apparatus, the image reading method, and the image reading program according to the embodiments can determine whether the reading RFID tag itself is abnormal or the RFID detection unit is abnormal based on results of detection of the diagnosing RFID tag and the reading RFID tag and portions of an RFID system where abnormality occur can be easily discriminated, there is achieved an effect that an abnormal portion of the RFID system can be accurately detected.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
   an RFID (radio frequency identification) detection unit that detects a reading RFID (radio frequency identification) tag disposed to a reading target;
   an image reading unit that reads an image of the reading target;
   a diagnosing RFID (radio frequency identification) tag capable of being detected by the RFID detection unit; and
   an abnormality determination unit that determines abnormality based on a state of detection of the RFID detection unit, wherein
   when the diagnosing RFID tag is detected at the time the reading RFID tag is not detected by the RFID detection unit, the abnormality determination unit determines abnormality of the reading RFID tag, and when the diagnosing RFID tag is not detected, the abnormality determination unit determines abnormality of the RFID detection unit.

2. The image reading apparatus according to claim 1, wherein;
   the image reading apparatus is of a flatbed type;
   the RFID detection unit and the image reading unit are disposed to a main body of the image reading apparatus; and
   the diagnosing RFID tag is disposed to a lid member for covering a placing surface on which the reading target is placed.

3. The image reading apparatus according to claim 2 comprising:
   an open/close detection unit that detects an open/close state of the lid member, wherein
   when it is detected by the open/close detection unit that the lid member is closed at the time the diagnosing RFID tag is not detected by the RFID detection unit, the abnormality determination unit regards that the diagnosing RFID tag has been detected or detects the diagnosing RFID tag again.

4. An image reading method for reading a reading target disposed with a reading RFID (radio frequency identification) tag, comprising:
   detecting the reading RFID tag disposed to the reading target and a diagnosing RFID (radio frequency identification) tag by an RFID (radio frequency identification) detection unit for detecting the reading RFID tag;
   reading an image of the reading target; and
   determining abnormality of the reading RFID tag when the diagnosing RFID tag is detected at the time the reading RFID tag is not detected at the detecting, and determining abnormality of the RFID detection unit when the diagnosing RFID tag is not detected at the detecting.

5. A non-transitory computer readable storage medium storing therein a program for an image reading method for reading a reading target disposed with a reading RFID (radio frequency identification) tag, the method comprising:
   detecting the reading RFID tag disposed to the reading target and a diagnosing RFID (radio frequency identification) tag by an RFID (radio frequency identification) detection unit for detecting the reading RFID tag;
   reading an image of the reading target; and
   determining abnormality of the reading RFID tag when the diagnosing RFID tag is detected at the time the reading RFID tag is not detected by the detecting, and determining abnormality of the RFID detection unit when the diagnosing RFID tag is not detected at the detecting.

* * * * *